Patented Nov. 11, 1941

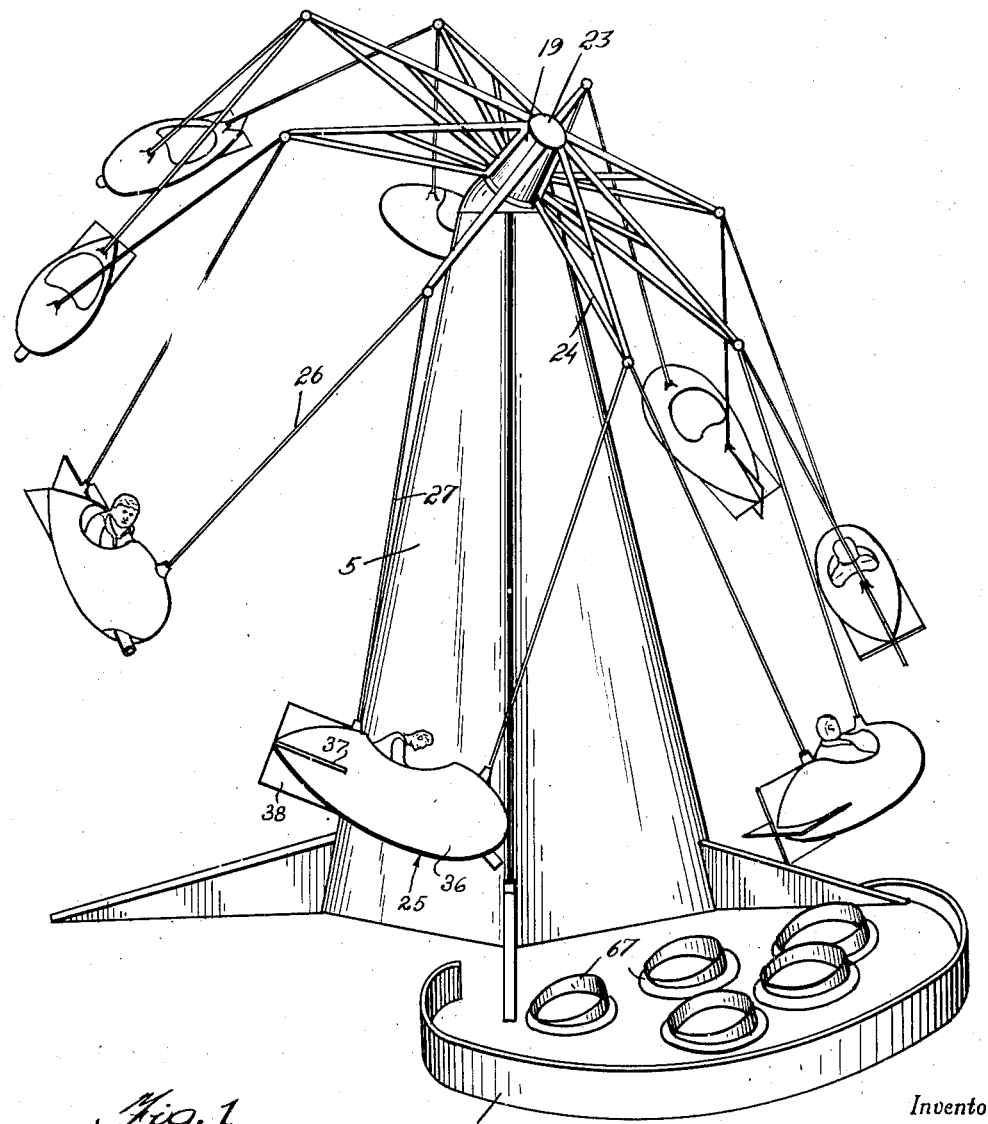

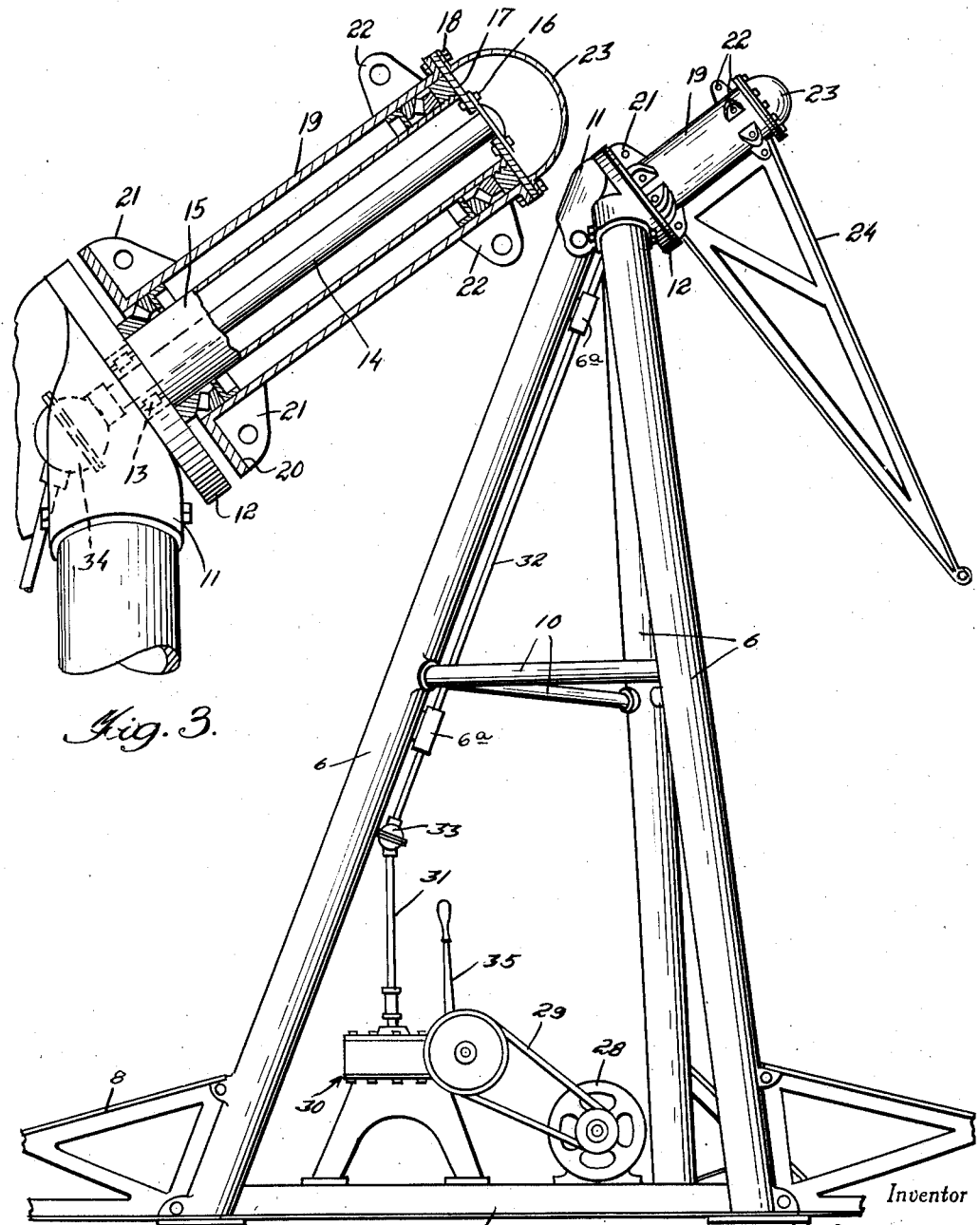

2,262,214

UNITED STATES PATENT OFFICE 2,262,214

AMUSEMENT APPARATUS

Robert W. Temple, Detroit, Mich.

Application November 4, 1940, Serial No. 364,313

1 Claim. (Cl. 272—51)

This invention appertains to new and useful improvements in amusement apparatus and more particularly to a roundabout which has as its principal object the provision of an apparatus simulating in its antics the military art of "dive bombing."

The use and various other important objects and advantages of the invention will become apparent to the reader of the following specification.

In the drawings—

Figure 1 represents a perspective view of the apparatus.

Figure 2 is a fragmentary side elevational view of the apparatus showing the occupant carriers and certain other elements of the apparatus removed.

Figure 3 is an enlarged fragmentary details sectional view of the hub assembly from which the occupant carriers are suspended.

Referring to the drawings wherein like numerals designate like parts, it can be seen that numeral 5 denotes a pyramidal-shaped shell for enclosing upwardly inclined uprights 6 which are mounted on suitable base plates 7 and which have outriggers 8 to stabilize the same. A suitable platform or other brace means 9 connect the lower portions of the uprights 6 and intermediate connecting members 10 can also be provided for bracing and fixing the relationship of these uprights 6.

A union 11 is provided at the upper ends of the uprights 6 to definitely connect these ends together in the relationship substantially shown in Figure 2. This union 11 has a disk-shaped plate 12 set at a plane at obliquely with respect to a line drawn perpendicular to the ground or the platform 9.

Extending through a bearing 13 in the plate 12 is a shaft 14 which extends through a hollow stub 15 and is secured by suitable means 16 at its upper end to a drive plate 17, which in turn is secured by suitable means 18 to a tubular hub 19 which at its lower end is provided with a circumferentially extending flange 20, inwardly from which extend webs 21. Apertured ears 22 are provided at the outer end portion of the hollow hub 19. The securing means 18 also secures to the plate 17 a dome or cap 23 concealing the outer end of the shaft 14.

Elongated fabricated triangular shaped arms 24 have their inner ends interposed between the webs 21 and ears 22 and are bolted to these elements 21 and 22.

The arms 24 serve to suspend cars or occupant carriers generally referred to by numeral 25, which are preferably in the form of aeroplanes. Depending from each of the arms 24 at the outer end thereof is a pair of cables 26 and 27 which connect respectively to the nose portion of one carrier 25 and to the tail portion of the next forwardly located carrier 25.

Upon the platform 9 is a power plant 28 which by way of a drive belt 29 and gear assembly generally referred to by numeral 30 drives the interconnected drive shaft sections 31 and 32, the sections 31 and 32 being connected by a universal joint 33, while the upper end of the drive shaft section 32 is connected by a universal connection 34 to the shaft 14 and is disposed through bearings 6a. Suitable control means 35 can be employed for stopping and starting the apparatus.

Each of the occupant carriers 25 consist of a body or fuselage 36 having a seat therein and an opening in the top through which the upper portion of a person's body can extend. A stabilizer 37 and a rudder 38 are provided for the rear end of each body 36.

Occupants may drop or shoot missiles from the cars. On the ground adjacent the pyramidal-shaped shell 5 is provided a substantially arcuate guard fence 66 which prevents the missiles 64 from rolling away on the ground in the event the cup-shaped targets 67 are missed.

It can now be seen, that as the hub 19 rotates the carriers 25 are swung on a plane obliquely with respect to the ground, the action being that the carriers move upwardly from a low point to a high point, bank and then swing downwardly in a dive, simulating the power dive of a dive bomber and as the carriers approach the target 67, the occupants may release missiles in attempt to drop the missiles into the target cups 67.

While the foregoing specification sets forth the invention in specific terms, it is to be understood that numerous changes in the shape, size and materials may be resorted to without departing from the spirit and scope of the invention as claimed hereinafter.

What is claimed is:

In an amusement apparatus, a tower, an inclined stationary hollow stub projecting from the upper portion of the tower, a shaft extending longitudinally through the stub, a plate at the outer end of the shaft, a hollow hub surrounding the stub, bearing means between the stationary stub and the hub, said hub being secured at its outer end to the plate to rotate with the shaft, and occupant carrier supporting arms extending radially from the hub, said tower consisting of a plurality of upwardly converging uprights, bearings on one of the uprights, a shaft disposed upwardly through the bearings on the upright, drive means at the lower end of the last-mentioned shaft, and a universal connection between the upper end of said last-mentioned shaft and the inner end of the first-mentioned shaft.

ROBERT W. TEMPLE.